US009159240B2

(12) United States Patent
Cornell et al.

(10) Patent No.: US 9,159,240 B2
(45) Date of Patent: Oct. 13, 2015

(54) METHODS AND SYSTEMS FOR TAILORED ALLOCATION OF ARRIVALS

(75) Inventors: Bradley D. Cornell, Lake Stevens, WA (US); Robert W. Mead, Covington, WA (US); Louis J. Bailey, Kent, WA (US); Gregory T. Saccone, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 1412 days.

(21) Appl. No.: 12/405,865

(22) Filed: Mar. 17, 2009

(65) Prior Publication Data

US 2010/0241345 A1    Sep. 23, 2010

(51) Int. Cl.
*G06F 19/00* (2011.01)
*G06G 7/70* (2006.01)
*G06G 7/76* (2006.01)
*G08G 5/00* (2006.01)
*G08G 5/02* (2006.01)

(52) U.S. Cl.
CPC .............. *G08G 5/0043* (2013.01); *G08G 5/003* (2013.01); *G08G 5/0013* (2013.01); *G08G 5/0034* (2013.01); *G08G 5/0039* (2013.01); *G08G 5/025* (2013.01); *Y02T 50/84* (2013.01)

(58) Field of Classification Search
CPC ... G08G 5/003; G08G 5/0034; G08G 5/0039; G01C 23/00; G01C 23/005; G01C 19/32; G01S 1/02; B64D 2700/6221; B64D 11/0015
USPC .............. 701/4–6, 16, 18, 120; 340/973, 976
See application file for complete search history.

(56) References Cited

U.S. PATENT DOCUMENTS

| 4,642,775 | A  | 2/1987 | Cline et al.     |
| 6,278,965 | B1 | 8/2001 | Glass et al.     |
| 6,393,358 | B1 | 5/2002 | Erzberger et al. |

(Continued)

FOREIGN PATENT DOCUMENTS

EP    1818891 A2    8/2007

OTHER PUBLICATIONS

International Search Report and Written Opinion of PCT/US2010/024722; Jul. 26, 2010; 19 pages.

(Continued)

*Primary Examiner* — Jeffrey Shapiro
(74) *Attorney, Agent, or Firm* — Armstrong Teasdale LLP

(57) ABSTRACT

A tailored arrival allocation system (TAAS) for determining a descent profile for an aircraft is described. TAAS includes a gateway operable for establishing communications between TAAS and aircraft, and for establishing communications between TAAS and at least one of a source of weather data, an air traffic services facility, and an airlines operations center. A processing device communicatively coupled to the gateway calculates a descent profile based on data received from a plurality of an air traffic services coordination function, an airline operations center function, data from the aircraft, and data received from a weather station that allows the aircraft to meet the required time at one or more metering fixes during the descent. Output interfaces provide data relating to the calculated descent profile to the processing device. The gateway communicates with a flight management computer for the aircraft to incorporate the calculated descent profile onto the flight management computer.

22 Claims, 5 Drawing Sheets

(56) References Cited

U.S. PATENT DOCUMENTS

| | | |
|---|---|---|
| 6,584,400 B2 | 6/2003 | Beardsworth |
| 6,604,044 B1 | 8/2003 | Kirk |
| 6,606,553 B2 | 8/2003 | Zobell et al. |
| 2003/0055689 A1* | 3/2003 | Block et al. .................. 705/5 |
| 2004/0193362 A1 | 9/2004 | Baiada et al. |
| 2006/0173609 A1 | 8/2006 | Green |
| 2007/0032921 A1* | 2/2007 | Allen ............................ 701/3 |
| 2007/0219679 A1* | 9/2007 | Coulmeau ..................... 701/3 |
| 2008/0177432 A1* | 7/2008 | Deker et al. ................. 701/17 |
| 2010/0082186 A1* | 4/2010 | Burgin et al. ................. 701/9 |
| 2010/0241345 A1* | 9/2010 | Cornell et al. ............. 701/120 |

OTHER PUBLICATIONS

Coppenbarger, R. et al; Field Evaluation of the Tailored Arrivals Concept for Datalink-Enabled Continuous Descent Approach; 7th AIAA Aviation Technology, Integration and Operations Conference; Sep. 18-20, 2007; pp. 1-14; Belfast, Northern Ireland.

Korn, B. et al.; 4D Trajectory Management in the Extended TMA: Coupling AMAN and 4D FMS for Optimized Approach Trajectories; 25th International Congress of the Aeronautical Sciences; ICAS 2006; pp. 1-10.

Weitz, L. et al; An Analysis of Merging and Spacing Operations with Continuous Descent Approaches; Digital Avionics Systems Conference 2005; Oct. 30, 2005; IEEE Vo; 1; pp. 2.C.3-1 though 2.C.3-11.

* cited by examiner

METHODS AND SYSTEMS FOR TAILORED ALLOCATION OF ARRIVALS

BACKGROUND

The field of the disclosure relates generally to managing airspace, and more specifically, to methods and systems for tailored allocation of aircraft arrivals.

As air traffic increases worldwide, managing airspace has become more challenging, and air traffic controllers are responsible for making increasingly complex decisions. In a particularly challenging area, when an aircraft descends from cruise through an arrival phase and then onto an airport approach, several air traffic controllers are responsible for directing the aircraft through the airspace for which each individual controller is responsible and also determining a flight profile for the aircraft. While the ability of air traffic controllers to safely route aircraft has been proven by years of successful operation, the consequence of depending solely on human calculations is that the available airspace is not most efficiently used, and the aircraft cannot descend at the most optimal profile while still maintaining maximum throughput to the runways for the airports served by the arrival airspace.

The standard descent solution involves each air traffic controller giving clearance through the specific portion of the descent path which they control, from sometime prior to descent initiation all the way through to the runway. Typically, multiple airspace partitions are involved, with three or four geographically disparate air traffic control centers with their own systems, and often several different controllers within each of those centers developing and executing their own specific tactical plans for moving the flight through their airspace of responsibility, without knowledge of the subsequent controller's plan or intentions regarding the flight. This lack of an integrated airspace approach to arrivals results in a step-by-step descent characterized by several cruise and descent patterns until the aircraft reaches the runway. These relatively uncoordinated descent segments lead to increased fuel consumption, noise, emissions, and flight time.

In addition, the desire for operational economy and reduced environmental impact must be tempered with practicality from several sources. Safety must be assured by avoidance of severe weather, terrain, and other traffic and by conformance with variable airspace availability. In addition, airport and runway capacity must be maintained by precise, predictable sequencing and by coordination of arrival and departure streams. Furthermore, the optimal trajectory for each aircraft depends on its individual performance characteristics.

Each airline implements a cost index which they use to execute flight planning. The cost index is a relation between the cost of time (crew, maintenance, ownership, etc) versus the cost of fuel, taking into account the specific performance characteristics of the aircraft, the engines it is using, and the weight it has for this specific flight. The cost index varies by airline, and even by flight for a given airline, further complicating the problem of calculating a tailored arrival allocation for a specific flight. For example, one airline may prefer to land quickly and take off quickly to minimize time on the ground because the turn around time is the most important aspect of their business model. As a result, a flight for that airline may be more interested in descending with engines at higher throttle, while another airline would be more interested in fuel savings, so they would prefer descending with engines near idle.

The existing descent solution for aircraft is determined by each air traffic controller. Using the knowledge gained through many years of experience, air traffic controllers are able to manually calculate the lateral path, vertical path, and velocity appropriate for an aircraft to meet the four-dimensional position (latitude, longitude, altitude, and time) over one or more metering fixes within the descent. However, this path calculation is done in a piece-meal fashion, with each controller adjusting the flight tactically within his/her own airspace without knowledge of the next controllers execution plan.

While not currently existing, some automation tools are under development which may provide partial solutions to the problem. At least one developmental tool mirrors current air traffic practices by working in a piece-meal, segregated fashion, solving the problems in only one part of the airspace, and not coordinating these solutions with either preceding or succeeding airspaces along the route of the aircraft's flight.

The disadvantage of several controllers manually determining the appropriate flight path for an aircraft, within only the airspace for which they are responsible, is that they rely heavily on human calculations for precision calculations. Human calculations are inherently less precise than that of modern automation systems, resulting in inefficiencies. In addition, the lack of a coordinated plan stretching across multiple airspace segments leaves on-board aircraft automation entirely unable to participate in calculating and executing a most optimum path for a given descent.

Solutions such as en-route descent advisor (EDA) do not include aircraft operator preferences, inter-ATS facility coordination, and direct coordination with the aircraft operator. Instead, these solutions only provide incremental improvement to today's voice only, manual solution, and are designed with the fundamental limitations inherent in current operations.

As described above, current solutions focus on air traffic control giving aircraft discrete instructions, relayed via voice radio links between pilot and controller to turn left, right, climb, descend, or to change speed in order to get individual aircraft from departure to destination in non-integrated and largely uncoordinated steps. Such a process completely removes automation associated with the aircraft from being brought to bear in providing the most efficient solution to a flight problem. However, solving flight problems is exactly what certain aircraft systems, for example, navigation and flight management systems, have been designed to do.

In short, the airborne automation that has been developed with the express intention of optimizing flight path is completely removed from the equation, leaving only human calculations to rapidly piece together a solution. This situation is exacerbated by not only one human trying to optimize a path, but five to ten humans trying to optimize the solution, each acting independently and without knowledge of the intentions or objectives of the others.

BRIEF DESCRIPTION

In one aspect, a ground based tailored arrival allocation system (TAAS) for determining a descent profile for an aircraft is provided. The TAAS includes a communications gateway operable for establishing communications between the TAAS and an aircraft, and further operable for establishing communications between the TAAS and at least one of a source of weather related data, an air traffic services facility, and an airlines operations center. the TAAS also includes a processing device communicatively coupled to the communications gateway which is programmed to calculate a descent profile for the aircraft based on data received from a plurality of an air traffic services coordination function, an airline operations center function, data from the aircraft, and data received from a weather station that allows the aircraft to meet the required time at one or more metering fixes during the descent while taking into account fuel efficiency and environmental considerations. The TAAS also includes at least one output interface communicatively coupled to the processing device for providing data relating to the calculated descent profile. The communications gateway is operable to communicate with a flight management computer for the aircraft to incorporate the calculated descent profile into the flight management computer. Communication to the flight management computer can be done directly, via the airline operations center, or via the air traffic services.

In another aspect, a method for providing a descent profile to an aircraft using a ground based tailored arrival allocation system (TAAS) is provided. The method includes establishing an automatic dependent surveillance (ADS) contact between the TAAS and the aircraft to capture its intent information, receiving, from the aircraft, an ADS report that includes intent information as well as an ETA over a first metering fix, analyzing, using the TAAS, position reports, radar and ADS surveillance data, and trajectory prediction data in relation to the first metering fix and the remainder of aircraft trajectory, creating, with the TAAS, clearances in accordance with a time associated with the first metering fix, airline preferences for the particular flight, ATS, and weather data, coordinating the clearances with upstream air traffic control centers, giving route clearance to the aircraft, from the TAAS, for loading into the flight management computer (FMC), coordinating the route clearance with downstream air traffic control centers, and uplinking any updated wind information to the aircraft from the TAAS for loading into the FMC.

In still another aspect, a method for generating a tailored arrival solution for an aircraft is provided. The method includes collating data from multiple sources including a plurality of air traffic services sequencing and scheduling, aircraft and airline flight preferences, weather, surveillance data, trajectory and intent information from the aircraft and airline preferences, filtering the collated data against a plurality of flight specific preferences, an aircraft arrival direction, aircraft performance parameters, airspace constraints, aircraft operator preferences, and terrain constraints, generating a tailored arrival solution for the aircraft, based on the filtering step, the tailored arrival solution including a plurality of speed, route, altitude, and a required time of arrival, and providing the tailored arrival solution provided to air navigation service providers, airlines operations centers, and the aircraft.

DETAILED DESCRIPTION

The described embodiments are utilized to calculate and dynamically provide an aircraft with the most optimal descent profile given the constraints of safety, airline preferences, aircraft performance, airborne flight path logic, terrain, weather, and air traffic. More specifically, the described embodiments relate to ground automation and logic enclosed in a Tailored Arrivals Allocation System (TAAS) which, using detailed knowledge of airborne automation and performance, ground system configuration, air situation, and aircraft operator preferences, determines the most efficient descent profile for an aircraft within the specific circumstances present in the airspace at the time of arrival.

Based on input data from multiple aircraft, aircraft operator systems, aircraft systems, and ground air traffic control systems, the TAAS integrates the parameters expected to be encountered during an arrival sequence such as aircraft performance, airborne flight path logic, air traffic, airspace, meteorological (weather) data, obstacle clearance, environmental issues, and airline preferences to develop custom or tailored route clearances using combinations of route, speed, and altitude changes or constraints in a format that can be used in the aircraft's flight management computing system for each individual aircraft to achieve the most beneficial flight path available.

The TAAS system described herein determines the correct constraint and profile envelope, from a ground system perspective, that allows an aircraft to make maximum use of its own unique flight optimization systems to provide the best profile for its operator, while still remaining within the required constraints of the surrounding airspace and operational situation such as the winds, air traffic congestion, terrain, etc. To address the problems associated with non-integrated, step-by-step arrivals mentioned above, the TAAS system also provides the capability to provide an ideal trajectory that allows the aircraft to meet the required time at one or more metering fixes during the descent (if any) while performing an idle descent along an optimal lateral and vertical path, de-conflicted from other aircraft, from weather, from terrain and airspace restrictions, and taking into account the specific preferences of the airline in general and for that particular flight. One result is a near-idle descent, or as close as possible, decreasing fuel consumption, noise, emissions, flight time, and air traffic controller workload as flights execute predictable flight paths through multiple air traffic control sectors and onto the runway.

Figure 1:
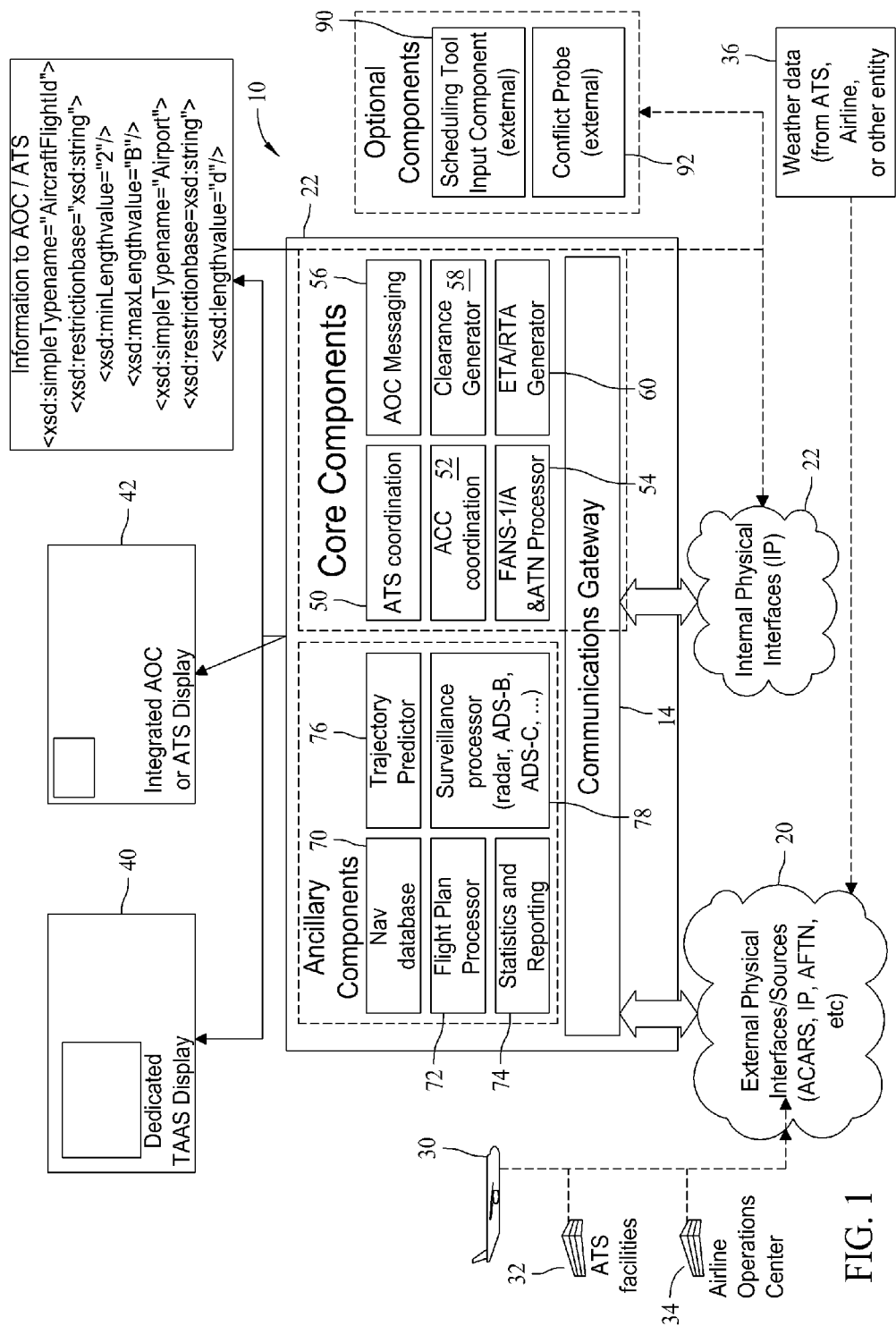
FIG. 1 is a block diagram of one embodiment of a Tailored Arrivals Allocation System (TAAS) also illustrating devices with which the TAAS communicates.

FIG. 1 is a block diagram 10 of one embodiment of a Tailored Arrivals Allocation System (TAAS) 10 which includes a processing function 12 and a communication gateway 14 through which the processing function 12 transmits and receives data through external physical interfaces 20 and internal physical interfaces 22. External interfaces 20 provide a communications function to and from aircraft 30, air traffic service (ATS) facilities 32, airline operations centers (AOC) 34, and weather data 36, for example. The type of data received and transmitted through external interfaces 20 may include, for example, data from an aircraft communication addressing and reporting system (ACARS) and/or an aeronautical fixed telecommunications network (AFTN). Information generated by TAAS 10 may be provided to a user, for example, via a dedicated TAAS display 40, and an integrated airline operations center and/or air traffic services display 42.

Core components within the TAAS processing function 12 include ATS coordination 50, AOC coordination 52, future air navigation system (FANS) and aeronautical telecommunications network (ATN) processor 54, AOC messaging 56, clearance generator 58, and estimated time of arrival/required time of arrival (ETA/RTA) generator 60, each of which are further described below. Ancillary components within the TAAS processing function 12 include navigation database 70, flight plan processor 72, statistics and reporting 74, trajectory predictor 76, and surveillance processor 78.

In FIG. 1, the primary TAAS functions are indicated as which functions are core to the TAAS invention, which functions are ancillary functions, supporting the core functions, and optional functions, such as scheduling tool input component 90 and conflict probe 92, which can be provided by the TAAS system 10 or hosted outside the TAAS system 10 by either ATS facility 32 or AOC facility 34.

The ATS coordination function 50 is capable of processing various pieces of operational information, such as clearance information, airspace configuration information, scheduling and arrival information for the aircraft, data from airline operations center, and other sources internal and external to the TAAS. The ATS coordination component also times delivery of such information to the aircraft and to the ATS facilities.

The AOC coordination function 52 is capable of processing various pieces of operational information such as route information, clearance and request information, scheduling and arrival information, aircraft weight data, airline and flight-specific cost index considerations, weather information, and airline operating preferences and guidelines for the aircraft, airline operations center, and other sources internal and external to the TAAS system 10. The AOC coordination function 52 also times delivery of such information to the aircraft and to the airline operations center 34.

The FANS-1/A and ATN processor function 54 is capable of processing operational information, including clearance data, requests, ADS-C surveillance information, weather information, and other types of data, for receiving from and forwarding to the aircraft, and/or forwarding to and receiving from the ATS facilities 32.

The AOC messaging function 56 is capable of processing operational information including clearance requests, flight plan data requests and deliveries, and other types of data, for receiving from and forwarding to the aircraft.

A clearance generator function 58 is capable of incorporating trajectory information, clearance information, airline preference information, aircraft and FMC-specific information for the flight, weather information, ETA/RTA (Estimated Time of Arrival/Required Time of Arrival) information, and other information, and generating a beneficial time of arrivals clearance available as a result of the integration of known aircraft performance, air traffic, airspace, meteorological, obstacle clearance and environmental constraints expected to be encountered during an arrival.

An RTA/ETA generator function 60 is capable of incorporating trajectory information, airline preference information related to multiple aircraft arriving into the same airspace, weather information, ATS sequencing information, down-linked intent data, and other information, and generating the preferred ETA/RTA for the flight, placing the flight at a beneficial time(s) of arrival over merging and sequencing points, as a result of the integration of all known aircraft performance, air traffic, airspace, meteorological, obstacle clearance and environmental constraints expected to be encountered during an arrival.

As described above, the communications gateway 14 provides communications access to all of the internal and external components of the TAAS system 10, utilizing various protocols such as ARINC, IP, ATN, and others, as required by the individual systems utilizing the TAAS system 10.

TAAS system 10 and the processing function 12 therein constitute a ground-based system that provides air traffic controllers with a way to deliver an aircraft at its required time over a downstream fix (known as a "metering fix") while simultaneously satisfying other approach requirements. A cleared lateral path and other constraints are communicated to individual flights prior to Top Of Descent (TOD) as part of the arrival clearance for use by the Flight Management Computer (FMC) in calculation of the most optimized descent path within the constraints present for this flight at the time of this particular arrival. Updated meteorological information from weather data 36 is also provided to improve flight path efficiency, and to allow more precise path calculation and timing predictability. The clearance generator 58 may include speed and altitude constraints, and the use of lateral length adjustment to increase control authority for sequencing and coordination. The resulting arrival is tailored to provide the most efficient flight path under the existing conditions and will almost always be more efficient than that achieved with traditional tactical vectoring techniques.

TAAS system 10 also provides a mechanism to maximize airspace capacity and efficiency for departing, en-route, and arrival phases of flight. This methodology also solves the many issues associated with creating a significant transition step toward a trajectory based operational environment. The method implemented by TAAS system 10 uses data widely available from aircraft and existing data link systems and standards. The TAAS system 10 then specifically formats messages so they are usable by the various different flight management systems in-service on the vast majority of the commercial transport aircraft currently being utilized.

The TAAS system 10 takes into account the economic realities of air traffic management, that is, to succeed a cost effective solution for the airlines utilizing the service must be achieved. As such the TAAS system 10 is configured with the knowledge that nothing can be changed on the airplane, the methods and procedures used have to work with aircraft regardless of aircraft supplier, that a TAAS system based solution has to be implementable without the need for additional pilot training, and that provisions must be made for ATC and aircraft operators to set operational preferences or filters. These "ground rules" generally define the necessary functionality to enable the initial transition step toward a "trajectory based" operational environment, and constitute the only practical way to implement such new operating concepts as it does not require development of new flight critical aircraft systems which are traditionally only developed during the design of the original aircraft.

TAAS system 10 includes a "route generation engine" (ETA/RTA generator 60) that makes trajectory based operation possible. In one embodiment, the ETA/RTA generator 60 selects the time the aircraft is to pass over the metering fix. To accomplish this function, the ETA/RTA generator 60 uses scheduling data, intent data, and trajectory data, and identifies the time that is best for that aircraft according to the rules the ETA/RTA generator 60 is operating under. This time is then passed to the clearance generator 58, which selects the right path and speed for the aircraft so that the aircraft passes over the metering fix at the identified time.

More specifically, TAAS system 10 provides a solution to aircraft trajectory management, incorporating aircraft, air traffic, and aircraft operator needs and considerations into a single system that can be deployed with no new technology changes on the aircraft while still providing an immediate and measurable benefit. The TAAS system 10 provides ground and airborne systems with a comprehensive solution covering the entire path to destination, allowing the full capabilities of airborne automation to be bought to bear in providing the most beneficial, and the most predictable path based on ATS and aircraft operator needs and constraints.

Figure 2:
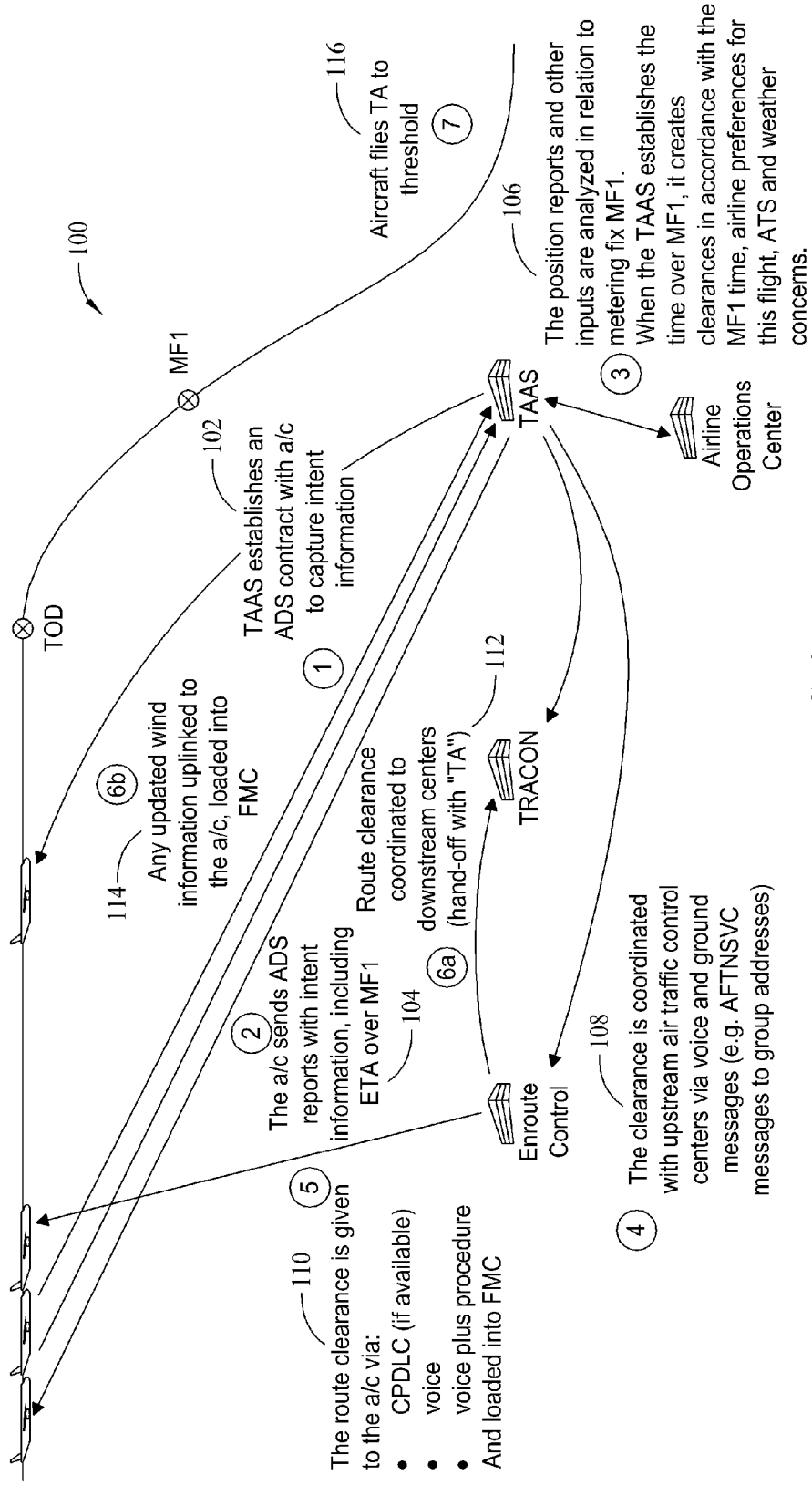
FIG. 2 is a diagram illustrating operation of the TAAS system with an air traffic control (ATS) facility.
Figure 3:
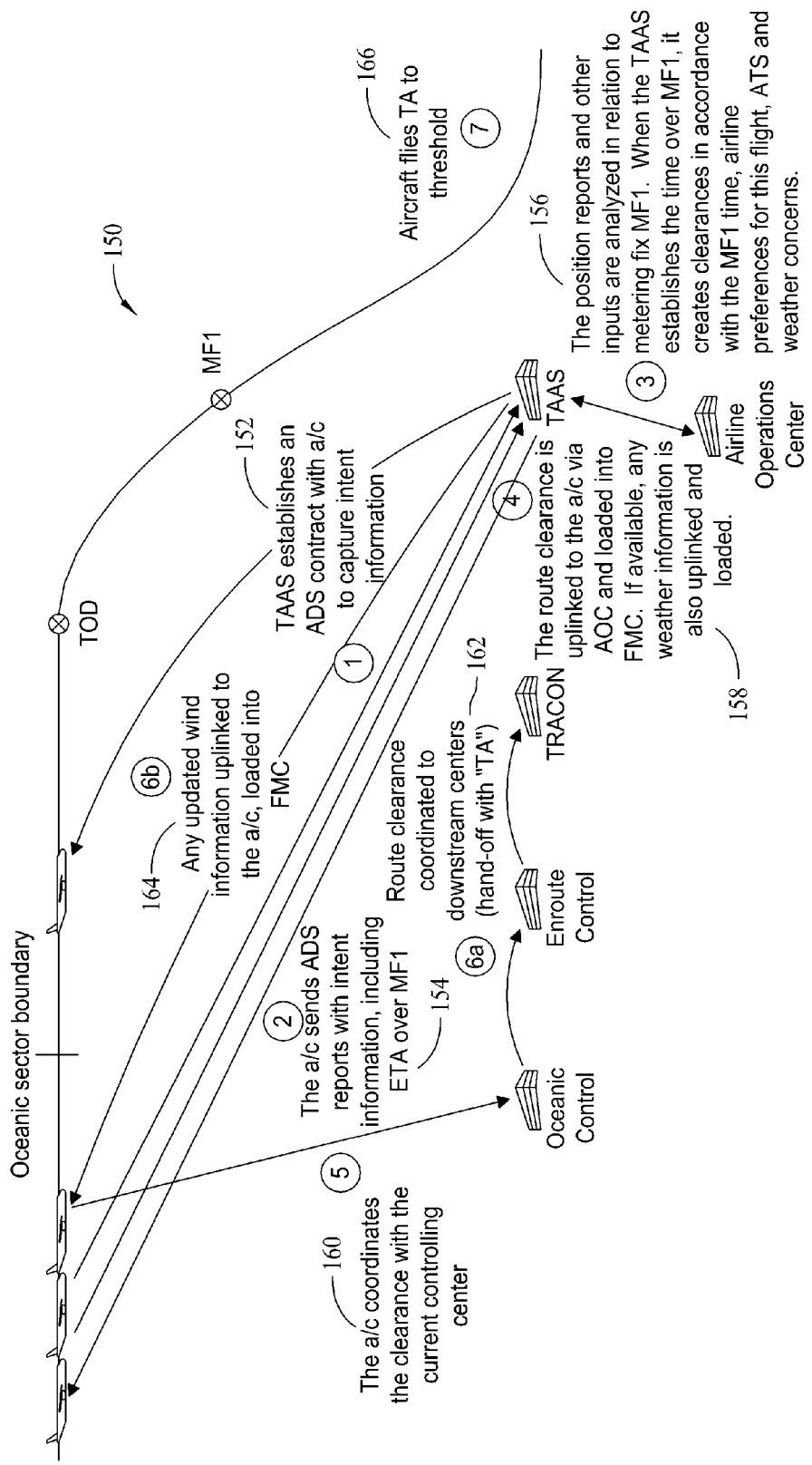
FIG. 3 is a diagram illustrating operation of the TAAS system with an airline operations center (AOC) facility.

The TAAS system 10 determines and delivers the correct constraint and profile envelope by interacting with the aircraft 30, multiple ATS facilities 32, and the airline operations facility 34. The TAAS system 10 is integrated with these entities in two primary configurations, primary integration with the air traffic control (ATS) facilities 32, as shown in FIG. 2, and with the airline operations center (AOC) facilities 34, as depicted in FIG. 3. A number of sequential events are depicted in FIGS. 2 and 3. The sequential events are top-level events that the TAAS system 10 oversees while establishing, delivering, and then monitoring the Tailored Arrival Advisories that it produces. While described in additional detail in the following paragraphs, these events can be generally described as coordinating data for delivery as a clearance to an aircraft. In the ATS primary configuration (FIG. 2) coordination is done with the ATS facility. In the AOC primary configuration, (FIG. 3) coordination is done with the Airline Operations Center. The TAAS system 10 can be applied to other configurations if required, based on local needs, technical constraints, operational needs, etc.

Within the above mentioned configurations the TAAS system 10 determines and delivers the correct constraint and profile envelope by utilizing Arrival Routing Attributes (ARA). These attributes are used to define the specific arrival routing parameters that the TAAS system 10 must work within to achieve the desired result. This setup function configures the TAAS system 10 to allow for nominal arrival routing which meets local constraints such as airport configuration, special use airspace, or local weather patterns, and similar local configuration information. Several different ARAs can be defined to cater for different runway configurations.

Now referring to FIG. 2, which is a flow diagram 100 associated with operation of TAAS system 10 primarily integrated with the air traffic control (ATS) facilities 32, the TAAS process starts by establishing 102 an automatic dependent surveillance (ADS) contact with an inbound aircraft to capture its intent information. The aircraft responds by sending 104 an ADS report that includes intent information as well as an ETA over metering fix number 1 (MF1). Position reports and other inputs are analyzed 106 by the TAAS system 10 in relation to MF1. When the TAAS system 10 establishes the time over MF1, as described above, it creates clearances in accordance with the MF1 arrival time, as well as considering one or more of ADS contact information, airline scheduling for the particular flight, scheduling data from ATS, and weather concerns.

The clearances created by TAAS system 10 are coordinated 108 with upstream air traffic control centers via voice and ground messages, such as aeronautical fixed telecommunication network (AFTN service messages to group addresses. The route clearance is given 110 to the aircraft via one of more of Controller Pilot Data Link Communications (CPDLC), voice, and voice plus procedure and loaded into the flight management computer (FMC). Route clearance is then coordinated 112 with downstream centers and any updated wind information is uplinked 114 to the aircraft and loaded into the FMC. The aircraft flies 116 the tailored arrival to the next threshold.

FIG. 3 is a flow diagram 150 associated with operation of TAAS system 10 primarily integrated with the airline operations facility 34. In this embodiment, the TAAS process starts by establishing 152 an automatic dependent surveillance (ADS) contact with an inbound aircraft to capture its intent information. The aircraft responds by sending 154 an ADS report that includes intent information as well as an ETA over metering fix number 1 (MF1). Position reports and other inputs are analyzed 156 by the TAAS system 10 in relation to MF1. as described above, when the TAAS system 10 (ETA/RTA generator 60) establishes the time over MF1, the clearance generator 58 creates clearances in accordance with the MF1 time, and one or more of the airline preferences for the particular flight, scheduling data from ATS, and weather concerns.

The clearances created by TAAS system 10 are uplinked 158 to the aircraft via the AOC, or direct from the TAAS system 10, and loaded into the FMC. The aircraft coordinates 160 the clearance with the current controlling center. Route clearance is then coordinated 162 with downstream centers and any updated wind information is uplinked 164 to the aircraft and loaded into the FMC. The aircraft flies 166 the tailored arrival to the next threshold.

Figure 4:
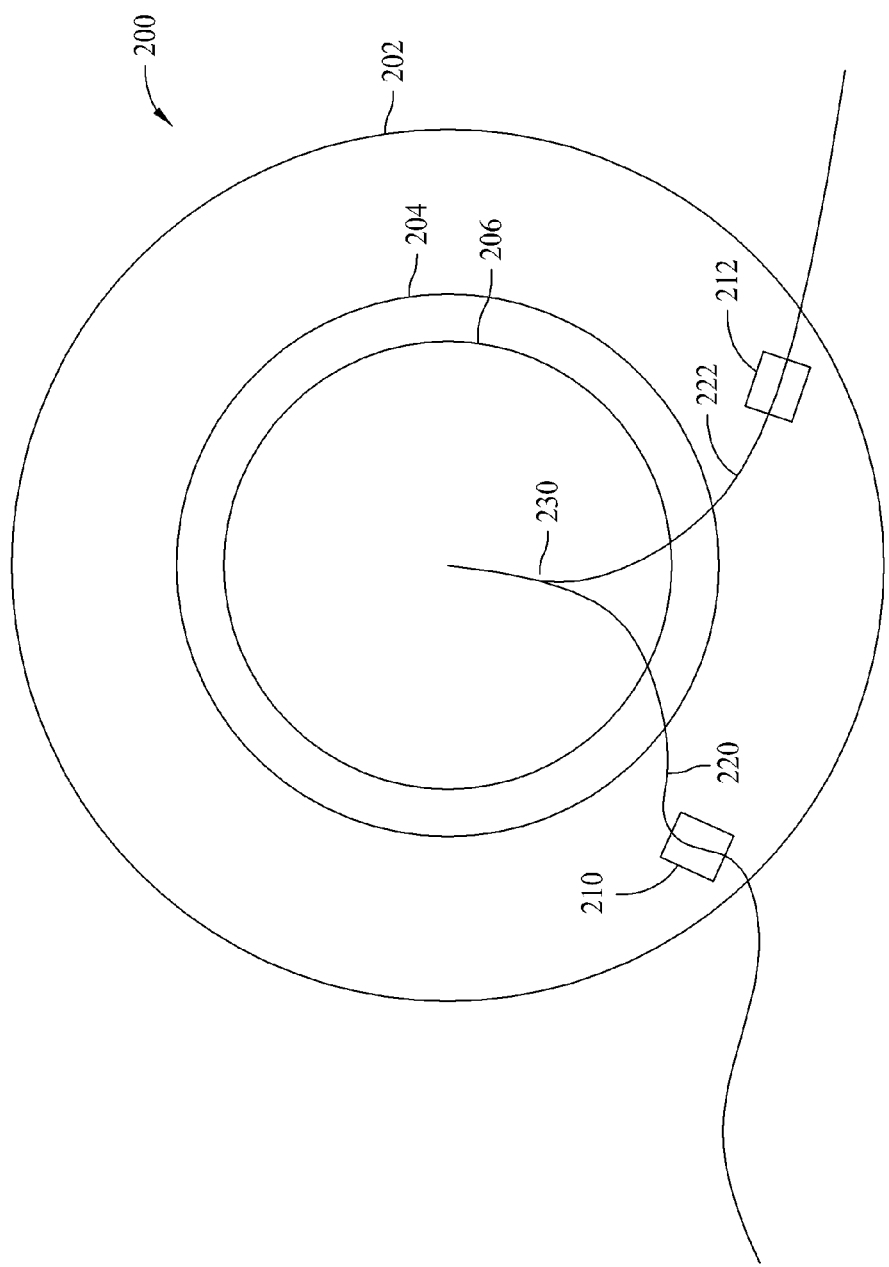
FIG. 4 is a depiction of a tailored arrivals area and its relationship to the arrivals airspace.

FIG. 4 is a depiction of a tailored arrivals area 200 and its relationship to the arrivals airspace. Area 200 includes an initial contact ring 202, a tailored clearance delivery ring 204, and a nominal top of descent (TOD) ring 206. Aircraft specific data for each inbound aircraft (210, 212) is acquired as that aircraft approaches an initial contact ring 202. Information is collated from the trajectory predictor function 76, the surveillance processor 77, the ATS coordination function 50, the AOC coordination function, and FANS-1/A and ATN processor 54. Aircraft data is collated with ground-based information such as surveillance information, airline preferences, current weather information, sequencing and scheduling requirements and availabilities, and current air traffic control situational information. This collated data is then applied to the arrival routing attributes (ARAs), which are held in a configuration file within TAAS system 10. The arrival routing attributes consist of airspace constraints applicable to all flights in the airspace (e.g. lateral constraints preventing flights from impacting terrain (e.g., aircraft must cross this point at or above 6000 feet, penetrating military closure areas, entering departure flight streams, as well as aircraft performance attributes and static airline preferences. The arrival routing attributes provide a filter and a first order assessment is conducted to identify potential conflicts with other aircraft, airspace constraints such as temporary restricted areas, sector overloads, any preferences for this specific flight which might be different from the general airline preferences in the arrival routing attributes such as a desire to gain time or save fuel, and timing information such as when an aircraft is scheduled to arrive over a metering fix.

Once potential conflicts are detected, TAAS 10 runs a series of calculations to see what tailoring method should be applied to resolve the conflict. For potential aircraft conflicts the TAAS systems first order priority is to apply "equal tailoring" to all potentially conflicted aircraft, except where an airline's preferences for its own aircraft might dictate that one aircraft is given precedence over one or more of its own aircraft. Using a combination of speed, altitude, route, and RTA adjustments, TAAS system 10 determines the best arrival solution for the aircraft. The ARA guides the TAAS system 10 as to how it may apply extra track miles along the nominal routing known to the system as the tailored arrivals area (TAA). The TAAS system 10 can apply speed and altitude constraints anywhere along the arrival route, however lateral path changes will only be applied within the TAA. Once the TAAS system 10 has determined the desired method and magnitude of the change required, the system encodes the final route clearance in a format which can be uplinked to the aircraft's flight management system.

As depicted in FIGS. 2 and 3, depending on its configuration, the TAAS system 10 can either make the resulting route clearance and associated tail number/flight number combination available to other ground automation systems for uplinking clearances/clearance requests to aircraft, or it can make the route available for display and uplink the route clearance/clearance request messages directly to the aircraft. Referring again to FIG. 4, the clearance is delivered to the aircraft when it reaches the clearance delivery ring 204. Delivering the tailored clearance as close to the top of descent as possible provides the most flexibility in conflict resolution. As described herein, TAAS 10 computes the clearances within area 200, along nominal arrival routes 220, 222 for multiple aircraft (210, 212) to achieve the desired separation at a predefined merge point 230. Attributes for area 200, described above, are defined in a modifiable database, in one embodiment. The attributes may dynamically change as weather, air traffic and other factors change. By enabling tailored clearances towards the end of the cruise segment of a flight, there is a better chance for minimally constrained descents for the individual aircraft.

Figure 5:
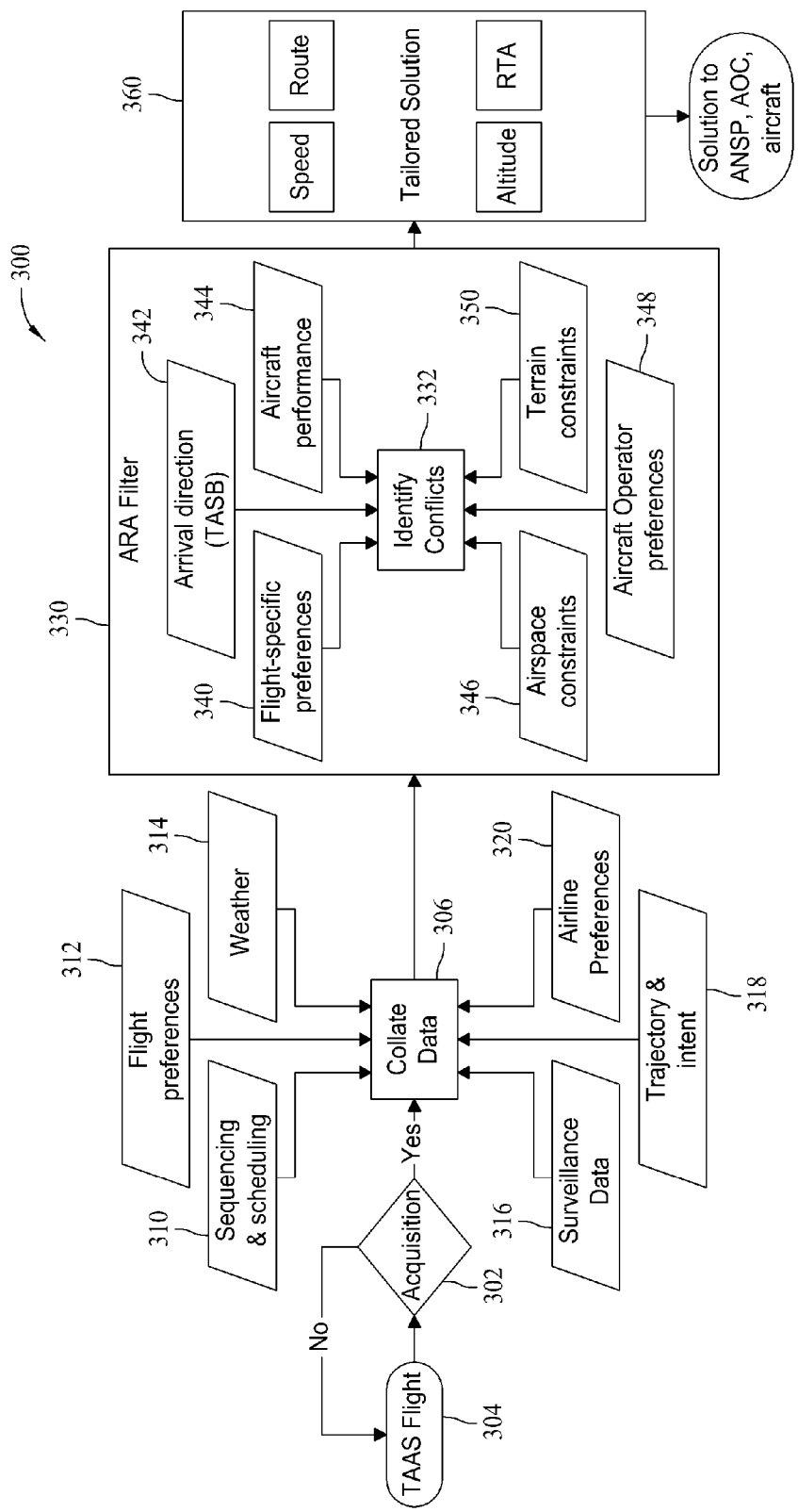
FIG. 5 is a flow diagram further illustrating generation of tailored arrival solutions utilizing the TAAS of FIG. 1.

FIG. 5 is a flow diagram 300 further illustrating generation of tailored arrival solutions utilizing the TAAS 10. During an acquisition step it is determined 302 whether the flight 304 is TAAS compatible. If the flight 304 is compatible, data from multiple sources is collated 306. Examples of the data sources include, but are not limited to, sequencing and scheduling 310, flight preferences 312, weather 314, surveillance data 316, trajectory and intent 318, and airline preferences 320.

The collated data is then input into the arrival routing attributes filter 330. To identify conflicts 332 with the collated data, it is filtered against one or more of flight specific preferences 340, arrival direction 342, aircraft performance 344, airspace constraints 346, aircraft operator preferences 348, and terrain constraints 350 to arrive at a tailored arrival solution 360 for the aircraft that includes speed 362, route 364, altitude 366 and required time of arrival RTA 368.

The arrival solution 360 is then provided 380 to air navigation service providers (airports and air traffic controllers), airlines operations centers and to the aircraft itself. Loading and executing the uplinked route clearances in the arriving aircraft's flight management systems allows full use of all the automation that is widely available in transport aircraft today. Unique airmanship, different company standard operating procedures, as well as crew errors caused by entering many individual clearances into airplane systems during high workload and sometimes high stress situations are drastically reduced if not eliminated in some cases using the methodology associated with the TAAS system 10.

TAAS system 10, in one embodiment, is configured to receive aircraft specific state data from many aircraft, incorporate other data, such as surveillance data, aircraft operator preferences, weather data, airspace information, etc. and then run multiple "mini flight planning scenarios". The TAAS system 10 uses the data received, and the results of the various flight planning scenarios, to arrive at the specific route clearances designed for individual aircraft of most benefit to that particular flight. The TAAS system 10 takes into account all known aircraft performance, air traffic, airspace, meteorological, obstacle clearance and environmental constraints expected to be encountered during that aircraft's arrival. The TAAS system 10 then determines the optimal aircraft descent trajectory, for the given conditions, while meeting a proposed time at an arrival metering, merging, or feeder fix.

When referring to the most benefit for a particular flight, the intended context is in regard to the goal of achieving all known constraints, with the minimum level of direct interference with the flight itself. The following paragraphs include examples of how the TAAS system 10 takes into account all constraints, ensures that only the minimum set of constraints are used, and then provides the flight the absolute maximum flexibility to achieve those constraints while still working towards the exclusive operational intent and aims of that aircraft and its operating airline in that unique arrival situation.

In a first example, a constraint may exist which requires the TAAS-served flight to stay above a certain flight level to avoid other air traffic arriving at or near the same time. Rather than providing a precise level to the flight to keep it clear of the conflicting flight(s), the TAAS system 10 might provide an "at or above" constraint to the aircraft to give the flight latitude in how it conducts the arrival in a most optimum fashion while still staying clear of the conflict.

In a second example, a flight may be required to meet a time over a metering fix, but not have any other potential conflicts or constraints along its lateral path to that metering fix. The TAAS system 10 might conclude that providing the flight with an RTA is the only constraint needed, allowing the flight full latitude in how it achieves that time, giving maximum unconstrained benefit to the flight while still meeting the single constraint. The TAAS system 10 has an ability to simultaneously compare, re-plan, and optimize many routes against one another in near real time which provides the route generation fidelity needed to make a trajectory based operating concept actually work in the real world.

In a third example, an airline may have two available times over a metering fix, with two flights that could meet both times. The TAAS system 10 considers airline operational preferences, and chooses which flight should take the first slot, and which the second. The TAAS system 10 then generates clearances for both aircraft, including lateral, vertical, speed, and time constraints as required, taking into account all other traffic and situational constraints apparent at the time. These clearances are then issued to both aircraft, achieving optimum overall benefit for the airline as a whole, with each flight optimized on its own arrival path within the overall driving airline benefit preference.

Finally, in a fourth example, a flight may be faced with a choice between two times over an arrival fix. The TAAS system 10 considers the airline preferences for that particular flight in that specific situation. In some cases the airline may prefer to have the flight arrive at the later of the two times, to allow slower speed and maximum fuel economy. In other cases the airline may prefer to have the flight arrive at the earlier of the two times, sacrificing some fuel in order to get the aircraft on the ground sooner. The TAAS system 10 allocates the correct vertical, lateral, and speed constraints to the aircraft to achieve the correct preference on that particular day, based on knowledge of airline preferences, aircrew needs, and other known ATS and situational constraints.

The TAAS system 10 uses the functions described herein to achieve the above described results through a plurality of rules. These rules are unique, especially in their interaction within the TAAS system 10 to achieve a single result of unique and maximum benefit to any given flight, in any given situation, in order to achieve each flight's most optimum clearance. These rules are implemented when the TAAS system 10 has collected all relevant surveillance, preference, weather, and other information on the flight and the situation from the flight's current position to its landing time at the destination runway. The TAAS system 10 then begins to formulate the clearance for the flight:

If there are no situation-specific conflicts (ATS or otherwise), the TAAS system 10 will provide the aircraft a lateral route to a destination, including only those lateral, vertical, and speed constraints standard to the airspace such as controlled airspace limits, terrain avoidance limits, and constraints designed to deliver the aircraft to the Final Approach Fix configured for the final approach. If the only constraint is a time over a metering fix, or if the aircraft needs to adjust its time of arrival at the edge of the arrival area while still in cruise to better fit within other arrival streams, the TAAS system 10 makes maximum use of lateral route changes at cruise level to adjust timing, due to the better flight efficiency at cruise level, and provides the aircraft an RTA to the appropriate point, along with only those constraints standard to the airspace such as controlled airspace limits, terrain avoidance limits, and constraints designed to deliver the aircraft to the Final Approach Fix configured for the final approach.

If additional constraints are required because of the arrival situation, such as level constraints to ensure separation from other aircraft or aircraft streams, or lateral or speed restrictions needed to integrate the flight with other arriving aircraft or maintain separation with close proximity flights, the TAAS system 10 determines if the problem can be solved with speed adjustment, provide a speed schedule clearance, derive the speed and level constraints the aircraft must meet while still meeting timing requirements, and add these to the overall clearance package to be delivered to the aircraft.

A speed schedule is the calculated or manually entered speeds the flight management system (FMS) is scheduled to use for the climb, cruise, and descent when considering schedule requirements, ATC clearance, fuel, and operating costs. Using the cost index and other aircraft parameters an economical speed (i.e., a calibrated airspeed and/or mach speed) is computed and scheduled for use during each of the flight phases.

If the problem provides additional actions, such as altitude or speed restrictions at specific points along the arrival path, the TAAS system 10 derives the required altitude and speed constraints and adds these to the overall clearance package to be delivered to the aircraft. In all cases, the TAAS system 10 seeks to minimize the impact of the restrictions by using "at or above" and "at or below" constraints giving the aircraft the freedom to optimize its own path while still meeting the driving intent of the constraint.

In developing clearance packages for a flight the TAAS system 10, in one embodiment has several overriding rules. A first rule is to minimize the constraints. Only absolutely required constraints will be included. A second rule is when developing constraints, attempt to use the least restrictive form of the constraint (e.g. "at or above" rather than "at"). A third rule is to try to design the constraints to fit within a near-idle descent path for the subject flight. A fourth rule is to ensure that, as far as possible, solutions are delivered to the aircraft 20 minutes prior to TOD to ensure maximum use of on-board automation, and as required thereafter. A fifth rule is to ensure that both the aircraft and the ground systems have the most accurate descent wind forecasts possible, and that these are delivered to the aircraft at least 100 nautical miles prior to TOD, and as required thereafter.

The difference between the solution provided through TAAS system 10 and currently used solutions is that air traffic controllers may not use the same selection logic for each aircraft when they calculate the descent profile, they do not have the same amount of information available to them, and simply do not have the time available to process that information if it was made available to them. In fact, each controller may use a different constraint each time they direct a flight, and each controller may issue a constraint in conflict with the previous or following controller's constraints in terms of flight efficiency (e.g. one controller may speed the aircraft up to get it through their sector, only to have the next sector slow the same flight, with the aircraft unnecessarily burning extra fuel in both cases). Other solutions rely on future system modifications in the aircraft. The TAAS system 10 utilizes capabilities currently found on a majority of the passenger aircraft being utilized today. Another difference is that the TAAS system 10 includes aircraft operator preferences, inter-ATS facility coordination, and direct coordination with the aircraft operator. The TAAS system 10 provides a whole airspace, fully integrated solution, while other solutions all focus on a single airspace area (e.g. cruise to approach, approach to runway). The TAAS system 10 addresses the whole airspace, and includes all parameters applicable to the flights involved in the arrival solution.

In summary, based on input data from multiple aircraft, aircraft operator systems, aircraft systems, and ground air traffic control systems, the TAAS 10 integrates all parameters expected to be encountered during an arrival such as aircraft performance, airborne flight path logic, air traffic, airspace, meteorological, obstacle clearance, environmental, and airline preferences to develop custom or tailored route clearances using combinations of route, speed, and altitude changes or constraints in a format that can be used in the aircraft's flight management computing system for each individual aircraft to achieve the most beneficial flight path available.

Use is made of aircraft-provided intent data, and that data is correlated with algorithms on the TAAS system, in order to provide highly accurate ETA estimates and monitoring. The intent data may come from ADS-C messages or from the flight management computer (FMC) directly using a combination of AOC request messages. The TAAS methodology makes use of detailed aircraft parameters and FMC characteristic knowledge to further enhance predictability, including, discerning phase of flight, FMC mode, control inputs, cost indices, real-time aircraft operating parameters (e.g. gross weight) and applying these to prediction calculations.

Airline operator preferences can be included in TAAS-generated solutions. Airline operator preferences come both from ground-based configuration files and from dynamic inputs provided by the AOC.

In certain embodiments, the ability to dynamically create clearances is based on a 'playbook' of clearances or a clearance can be constructed by applying knowledge of the aircraft and its current parameters as well as designated sections of airspace (that allow more discretion for aircraft trajectories), and automatically creating the corresponding DO-258A and/or DO-280A messages, which may then be presented to an operator and subsequently sent.

As described herein, TAAS 10 includes environmental impact objectives and constraints in TAAS solution creation as well as whole airspace considerations, with multiple air traffic control center constraints and needs being provided for in the TAAS solution. Capture of data, creation of the unique TAAS advisories, and all other parts of the TAAS invention is done with current aircraft capabilities. As such, TAAS 10 does not require special modifications of aircraft systems.

Unique combinations of speed, altitude, route, and RTA adjustments are used to derive the most optimum TAAS solution for an aircraft. Outputs to an operator include an updated ETA based on the calculations from the internal trajectory predictor, allowing an operator to set a window of acceptable error around an ETA, and "lock in" that ETA. If any subsequent deviations from the aircraft are detected, the color-coded ETA prediction window for the operator will change, alerting the operator. Such alerts can be provided for multiple aircraft.

As fully described herein, TAAS 10 works seamlessly with both airline operational control and air traffic control systems and operators (other solutions are designed for one or the other, and do not address or communicate with both).

TAAS 10, in one embodiment, utilize an adaptive gateway. This purpose-built gateway allows multiple protocol abstraction, so the applications will work regardless of what the physical connections and underlying protocols are (i.e. works both with ATN and FANS-1/A). Additionally, protocols and capabilities exist to send ground-ground coordination messages, which are based on the created clearance. This functionality allows inter-facility coordination, as well as communication with airline operational control facilities, and is adaptable to whatever protocol is used locally.

The ability of TAAS 10 to run in a standalone configuration or to connect to (via the gateway) and supplement an existing system is unique for the functionality it provides. Normally flight data processing systems are large, closed architecture legacy systems that require significant effort to provide additional functionality. In contrast, TAAS 10 is modular and extensible, and can interface with legacy architectures through existing interfaces to provide clearance and/or data link functionality.

In operation, if there are no situation-specific conflicts (ATS or otherwise), TAAS 10 provides the aircraft with a lateral route to a destination, including only those lateral, vertical, and speed constraints standard to the airspace. If the only constraint is a time over a metering fix, or if the aircraft needs to adjust its time of arrival at the edge of the arrival area while still in cruise to better fit within other arrival streams, TAAS 10 makes maximum use of lateral route changes at cruise level to adjust timing, and provides the aircraft an RTA to the appropriate point, along with only those constraints standard to the airspace.

If additional constraints are required because of the arrival situation, such as level constraints to ensure separation from other aircraft or aircraft streams, or lateral or speed restrictions needed to integrate the flight with other arriving aircraft or maintain separation with close proximity flights, TAAS 10 will provide a speed schedule clearance by deriving the speed and level constraints the aircraft must meet while still meeting timing requirements, and then add these constraints to the overall clearance package to be delivered to the aircraft.

If the problem provides additional actions, such as altitude or speed restrictions at specific points along the arrival path, TAAS 10 derives the required altitude and speed constraints and adds these to the overall clearance package to be delivered to the aircraft. In all cases, TAAS 10 seeks to minimize the impact of the restrictions by using "at or above" and "at or below" constraints giving the aircraft the freedom to optimize its own path while still meeting the driving intent of the constraint.

The TAAS system 10 provides an improvement over manually determined descent paths because it determines which constraint to use in each situation, resulting in the optimal descent trajectory for every case. Manual solutions sacrifice optimal descent to allow manual determination of a path which will allow maximum throughput in one air traffic control sector, will not provide an optimum profile within even that one sector, much less the entire profile from cruise altitude to runway threshold as the TAAS does. Moreover, the selection logic within the TAAS system 10 considers airline preferences when calculating the descent profile, allowing each airline to implement their business model. A more efficient flight profile is obtained than is obtained through human calculation.

This written description uses examples to disclose the various embodiments, including the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ground based tailored arrival allocation system (TAAS) for determining a descent profile for an aircraft, said TAAS comprising:
a communications gateway operable for establishing communications between said TAAS and an aircraft, and further operable for establishing communications between said TAAS and at least one of a source of weather related data, an air traffic services facility, and an airlines operations center;
a processing device communicatively coupled to said communications gateway, said processing device programmed to receive an intended descent profile from the aircraft while the aircraft is in route and calculate a new descent profile for the aircraft based on preference information provided at an input interface by at least one of the aircraft and an airline, the preference information including preferences for at least one of speed, arrival time, and route, and further calculate the new descent profile based on data received from a plurality of an air traffic services coordination function, an airline operations center function, data from the aircraft, and data received from a weather station that allows the aircraft to meet the required time of arrival of the aircraft at one or more metering fixes during the descent while taking into account fuel efficiency and environmental considerations; and
at least one output interface communicatively coupled to said processing device for providing data to the aircraft relating to the calculated new descent profile, said communications gateway operable to communicate with a flight management computer for the aircraft to incorporate the calculated descent profile into the flight management computer to modify the descent of the aircraft.

2. A ground based TAAS according to claim 1 wherein said at least one output interface comprises at least one of a dedicated display within the aircraft, an airline operations, center display, and an air traffic services display.

3. A ground based TAAS according to claim 1 wherein the data received by said processing device includes at least one of embedded terrain information, safety constraints, aircraft performance, weather information, air traffic information, and airborne flight path logic.

4. A ground based TAAS according to claim 1 wherein the data received by said processing device includes at least one of data from an aircraft communication addressing and reporting system (ACARS) and data from an aeronautical fixed telecommunications network (AFTN).

5. A ground based TAAS according to claim 1 wherein the data received from the air traffic services (ATS) coordination function comprises clearance information, airspace configuration information, and scheduling and arrival information for the aircraft, said ATS coordination function configured to time the delivery of the information and data to that aircraft and the air traffic services facility.

6. A ground based TAAS according to claim 1 wherein the data received from the airline operations center (AOC) coordination function comprises route information, clearance and request information, scheduling and arrival information, aircraft weight data, airline and flight-specific cost index considerations, weather information, said AOC coordination function configured to time the information and data to the aircraft and the airline operations center.

7. A ground based TAAS according to claim 1 wherein said processing device is programmed to process clearance data, requests, ADS-C surveillance information, and weather information for receiving from and forwarding to at least one of the aircraft and ATS facilities.

8. A ground based TAAS according to claim 1 wherein said processing device is programmed to include an AOC messaging function capable of processing clearance requests, flight plan data requests and deliveries for receiving from and forwarding to the aircraft.

9. A ground based TAAS according to claim 1 wherein said processing device is programmed to include a clearance generator function capable of incorporating trajectory information, clearance information, weather information, ETA/RTA (Estimated Time of Arrival/Required Time of Arrival) information to generate available time of arrival clearances.

10. A ground based TAAS according to claim 9 wherein said processing device is programmed to include aircraft performance information, air traffic information, airspace information, meteorological information, obstacle clearance information and environmental constraints expected to be encountered during an arrival to generate available time of arrival clearances.

11. A ground based TAAS according to claim 1 wherein said processing device is programmed to include an RTA/ETA generator function capable of incorporating trajectory information, airline preference information related to multiple aircraft arriving into the same airspace, weather information, ATS sequencing information, and intent data to generate a preferred ETA/RTA for the flight, and place the flight at a beneficial time of arrival over merging and sequencing points.

12. A ground based TAAS according to claim 1 wherein said communications gateway is further operable to coordinate the calculated descent profile with air traffic services and the airline operations center.

13. A method for providing a descent profile to an aircraft using a ground based tailored arrival allocation system (TAAS), said method comprising:
    establishing an automatic dependent surveillance (ADS) contact between the TAAS and the aircraft to capture its intent information while the aircraft is in route;
    receiving, from the aircraft in route, an ADS report that includes current route intent information as well as an ETA over a first metering fix;
    analyzing, by a processor, position reports, radar and ADS surveillance data, and trajectory prediction data in relation to the first metering fix and the remainder of aircraft trajectory;
    establishing an airline operational control data link with the aircraft to receive at least one of aircraft and airline preference information, to be used in creating the routing and profile for the aircraft, the preference information including preferences for at least one of speed, arrival time, and route;
    creating, by a processor in substantially real time, a new route and new clearances in accordance with a time of arrival of the aircraft associated with the first metering fix, the at least one of aircraft and airline information for the particular flight, air traffic services (ATS), and weather data; and
    sending the new route and new clearance to the aircraft, from the TAAS, for loading into the flight management computer (FMC).

14. A method according to claim 13 wherein giving route clearance to the aircraft comprises providing lateral, vertical, speed and time constraints to the aircraft, the constraints formatted for transmission to the aircraft, the transmission from at least one of air traffic services (ATS) and airline operational control facilities, a transmission from airline operational control facilities used as a request to ATS.

15. A method according to claim 13 further comprising coordinating the route clearances with upstream and downstream air traffic control centers.

16. A method according to claim 13 further comprising uplinking updated wind information from the TAAS to the FMC if the wind information affects the route clearances.

17. A method for generating a tailored arrival solution for an aircraft, said method comprising:
    receiving an intended route profile from the aircraft while the aircraft is in route;
    receiving at least one of aircraft and airline preference data provided at an input interface and data from multiple sources including a plurality of air traffic services sequencing and scheduling, weather, surveillance data, and airline preferences, the preference data including preferences for at least one of speed, arrival time, and route;
    filtering, by a processor, the collated data against a plurality of flight specific preferences, an aircraft arrival direction, aircraft performance parameters, airspace constraints, aircraft operator preferences, and terrain constraints; and
    generating, by a processor, a new route for the aircraft, based on the filtering step, the new route including a plurality of speed, altitude, and a required time of arrival; and
    providing the new route provided to air navigation service providers, airlines operations centers, and the aircraft to modify the route of the aircraft.

18. A method according to claim 17 further comprising:
    establishing an automatic dependent surveillance (ADS) contact with the inbound aircraft to capture its intent information; and
    receiving, from the aircraft, an ADS report that includes intent information and an estimated time of arrival over a first metering fix.

19. A method according to claim 17 wherein generating a tailored arrival solution for the aircraft comprises generating a time of arrivals clearance through the integration of known aircraft performance constraints, air traffic constraints, airspace constraints, meteorological constraints, terrain constraints and environmental constraints expected to be encountered during an arrival.

20. A method according to claim 17 further comprising generating preferred estimated times of arrivals and required times of arrival over merging and sequencing points based on trajectory information, airline preference information related to multiple aircraft arriving into the same airspace, weather information, air traffic services sequencing information, and intent data.

21. A method according to claim 17 wherein generating a tailored arrival solution for the aircraft comprises:
    selecting a time the aircraft is to pass over a metering fix using scheduling data, intent data, and trajectory data; and
    selecting a path and a speed for the aircraft so that the aircraft passes over the metering fix at the selected time.

22. A method according to claim 17 wherein providing the tailored arrival solution comprises at least one of:
- providing the resulting route clearance and associated tail number/flight number combinations available to other ground automation systems for uplinking clearances/clearance requests to aircraft; and
- making the resulting route clearance available for display on the aircraft via clearance request messages sent by the aircraft and uplink route clearance messages sent to the aircraft.

* * * * *